United States Patent [19]

Benson

[11] 3,854,161
[45] Dec. 17, 1974

[54] WINDSHIELD WASHER

[76] Inventor: Robert D. Benson, 2521 Cedar Ave., White Bear Lake, Minn. 55110

[22] Filed: Sept. 6, 1973

[21] Appl. No.: 394,569

[52] U.S. Cl. ............................ 15/250.04, 15/250.42
[51] Int. Cl. .............................................. B60s 1/48
[58] Field of Search....... 15/250.04, 250.01, 250.02, 15/250.03, 250.32, 250.36, 250.42

[56] References Cited
UNITED STATES PATENTS

| | | | |
|---|---|---|---|
| 1,763,153 | 6/1930 | Hobbins | 15/250.04 |
| 2,059,224 | 11/1936 | French | 15/250.04 |
| 2,910,715 | 11/1959 | Ohrt | 15/250.04 |
| 3,757,379 | 9/1973 | Benson | 15/250.04 |

FOREIGN PATENTS OR APPLICATIONS 544,311  1/1956  Belgium .......................... 15/250.04

*Primary Examiner*—Peter Feldman
*Attorney, Agent, or Firm*—Robert C. Baker

[57] ABSTRACT

Disclosed is a windshield washer structure for adhesive attachment in a substantially parallel contiguous relationship to a wiper blade supporting assembly for oscillation with that assembly during cleaning of a windshield. The washer structure comprises a flexible strip portion and an elongated tubular portion fixed longitudinally along one edge of the strip portion. The strip portion is thus characterized as a flange-like member extending laterally from the tubular portion. The flange-like strip portion is adapted to be adhesively affixed lengthwise upon a wiper blade supporting assembly to cause the tubular portion to be in a substantially parallel and laterally juxtaposed relationship to the wiper blade supported by that assembly. The tubular portion has a plurality of apertures therein located relatively on the ventral side thereof opposing a windshield as the washer structure is affixed as aforesaid upon a wiper blade supporting assembly. Thus, in operation, the apertures are adapted to direct washing fluid, as fed to the tubular portion, toward the windshield at a position adjacent the wiper blade during oscillation of the supporting assembly.

14 Claims, 8 Drawing Figures

PATENTED DEC 17 1974 3,854,161

WINDSHIELD WASHER

This invention relates to a new and improved windshield washer structure easily affixed by adhesive means to a wiper blade supporting assembly for oscillation with that assembly, and to composite windshield cleaning apparatus incorporating the new washer structure.

The present invention constitutes a substantial improvement and a new approach over that in my copending application Ser. No. 234,270, filed March 13, 1972, now U.S. Pat. No. 3,757,379.

Teachings of this invention may be used for the cleaning of the windshields of any standard vehicle. They are especially useful in connecting with the cleaning of the windshields of trucks and other large or expensive vehicles which generally are desired to be kept in motion for lengthy periods, but, for safety reasons, should have windshield cleaning apparatus which functions reliably under tremendous variations of speed, weather and adverse highway conditions. Unfortunately, conventional single spray washing jets as popularly employed (at the cowl of the windshield) for washing vehicle windshields are too frequently found to be unreliable in squirting the washing liquid upon the desired vision area of the windshield. They may function well at slow speeds, or sometimes at high speeds, but not reliably at both.

Many proposals have heretofore been advanced for improving the cleaning of windshields; for example, see the following U.S. Pat. Nos.: Shults et al. 1,647,319; Gustafson 1,655,266; Mokma 1,675,816; Adams 1,685,389; Damush 1,691,842; Lunsford 1,919,236; French 2,059,224; Deibel 2,632,911; Gorden et al. 2,648,865; Neufeld 2,714,739; Krusche 2,866,996; Eaves 2,869,166; Ohrt 2,910,715; Pruett 2,918,689; Williams 2,925,617; Webb 3,005,222; Marks 3,008,170; Lovell 3,171,154; Ziegler 3,192,550; Byczkowski et al., 3,418,676. Also note the following foreign patents: Canada 526,743 of June 19, 1956; Belgium 544,311 of January 31, 1956; and Switzerland 462,642 of Sept. 15, 1968.

Insofar as is known, however, no one heretofore has ever suggested an oscillatable windshield washer structure of the utter simplicity and economy of design and manufacture as taught herein, nor of the adhesive attachment type as taught herein, nor of the reliable effectiveness and safety of operation as taught herein.

The new washer structure of this invention is installed for the washing function by using a conceptual approach totally strange to all known prior art. It is easily and quickly installed by using adhesives to attach it to a wiper blade supporting assembly for oscillation therewith, whether that assembly has a yoke or is yoke free.

The yoke structure of the wiper blade supporting assembly is especially desirable as the base for adhesive attachment. It is readily accessible even to an unskilled person. Even when the yoke is composed of several parts, such as primary and subordinate yoke members, with hinges between the parts, the new washer structure of this invention can be adhesively attached over the yoke, even over hinges between primary and subordinate yokes, without substantial interference with yoke flexing in a direction perpendicular to a windshield (as required for curved windshields). The adhesive attachment of the new washer structure, and particularly the flexibility of the flange-like adhesively attached part or portion of the new washer structure, contribute significantly to the achievement of such results.

In essence, this invention provides a windshield washer structure designed for adhesive attachment in a substantially parallel contiguous relationship to a wiper blade supporting assembly for oscillation with that assembly during cleaning of a windshield. The washer structure comprises a flexible strip portion and an elongated tubular portion fixed longitudinally along one edge of the strip portion. The strip portion is thus characterized as a flange-like member extending laterally from the tubular portion. This flange-like strip portion is adapted to be adhesively affixed lengthwise upon a wiper blade supporting assembly, especially the yoke part thereof, in such manner as to cause the tubular portion of the washer structure to be in a substantially parallel but laterally juxtaposed (and also somewhat elevated) relationship to the wiper blade supported by that assembly. The tubular portion of the washer structure has a plurality of apertures therein located relatively on the ventral side thereof opposing a windshield as the washer structure is affixed, as aforesaid, upon a wiper blade supporting assembly. Thus, under operating conditions, the apertures are adapted to direct washing fluid, as the same is fed to the tubular portion, toward the windshield at a position adjacent the wiper blade during oscillation of the supporting assembly.

Preferably, the flange-like strip portion of the washer structure is substantially U-shaped in cross-section throughout its length, with the opening for the internal recess of the U-shape facing in approximately the same direction as the apertures of the tubular portion. However, the strip portion is not to be looked upon as an elongated clip (although it may perform a clip function). It is preferably approximately U-shaped for the purpose of causing it to fit or nest snugly in adhesive attachment over a wiper blade supporting assembly.

Also, the side of the flange-like strip portion which is adapted to be adhesively affixed upon a wiper blade supporting assembly suitably carries a layer of adhesive affixed thereto, with a removable liner to protect the adhesive during shipment and storage of the washer structure.

Additionally, the invention provides a composite windshield cleaning apparatus. This composite apparatus comprises several known elements, such as an elongated wiper blade for wiping a windshield, and a wiper blade supporting assembly including a yoke structure, the later being connected to an oscillatable wiper arm. The yoke structure is archable in a plane substantially perpendicular to the windshield; and both the wiper blade and the blade supporting assembly are flexible in that plane. This composite apparatus also includes a windshield spraying washer structure attached in substantially parallel relationship to the wiper blade supporting assembly for oscillation with that assembly, plus feed conduit means connecting the washer structure to a source of washing liquid for feeding washing liquid to the washer structure.

In this environment or broad characterization of elements, the invention provides the improvement wherein the windshield spraying washer structure comprises a flexible strip portion and an elongated tubular portion fixed along one edge of the strip portion. The strip portion is characterized as a flange-like member extending laterally from the tubular portion. The flange-like strip portion is adhesively affixed lengthwise upon the yoke structure of a wiper blade supporting assembly to cause the tubular portion of the washer structure to be in a substantially parallel and laterally juxtaposed relationship to the wiper blade. And the tubular portion has a plurality of apertures therein located relatively on the ventral side thereof opposing the windshield for directing washing fluid, as fed to the tubular portion, toward the windshield at a position adjacent the wiper blade during oscillation of the blade and its supporting assembly.

Further, the connection of the washing liquid feed conduit to the tubular portion of the washer structure is preferably at a mid point along the length of the tubular portion. This facilitates the fixing of the feed conduit substantially in parallel relationship to the oscillatable wiper arm almost from the very point of the feed conduit connection to the tubular portion of the washer. The entire oscillatable assembly thus is substantially or essentially free from any and all unwanted flapping elements and bulky elements which might cause interference with vision or cause driver distraction; and the entire assembly is not readily susceptible to fouling.

Additional benefits of the invention and details of it will further be described by reference to a drawing, made a part thereof, wherein.

Figure 1:
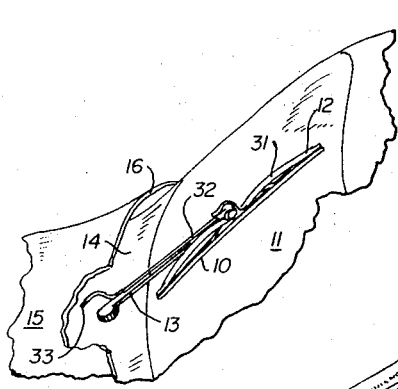
FIG. 1 is a schematic perspective view of a fragment of a windshield of a vehicle, showing composite windshield cleaning apparatus of the invention.

Referring to the drawing, particularly to FIG. 1 (and also to FIGS. 2 and 3), the basic conventional elements of the cleaning apparatus comprise an elongated wiper blade 10 for wiping the windshield 11 and a wiper blade supporting assembly. The blade supporting assembly may be free of a flexing yoke and therefore straight (as is common for trucks with flat windshields), or it may include a plural interconnected yoke structure 12; in turn connected to an oscillatable wiper arm 13. In modern automobiles, the entire assembly of wiper blade 10, its supporting assembly 12, and its wiper arm 13 is sometimes adapted to be moved to a rest position into a recess 14 of a modified cowling at the base of the windshield, with the hood 15 of the automobile curved upwardly at its edge 16 at the cowling portion to form the recess.

Figure 2:
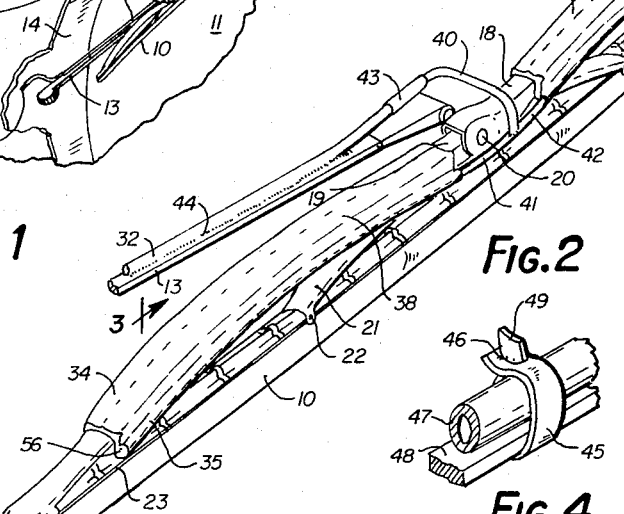
FIG. 2 is an enlarged schematic perspective view of the main portion of the windshield cleaning apparatus in FIG. 1.

Illustratively, as shown in FIG. 2, the major yoke structure or primary yoke 17 of a blade supporting assembly 12 may consist of two arms or parts 18 and 19, both hinged for flexing movement perpendicular to a windshield at an axis member 20 between them, and with a coiled spring (not shown) about the axis member 20 for urging each of the two parts 18 and 19 of the main yoke 17 toward a windshield. Each part 18 and 19 is suitably curved, as illustrated. Subordinate to the main yoke 17 may be a single secondary yoke 21, also attached for similar flexing and pivotal movement at the axis member 20. The clips 22 at the end of the arms of the main 17 and subordinate 21 yokes are attached slidably to a flexor strip 23 which supports the flexible rubbery wiper blade 10. The entire blade 10 and the blade supporting assembly 12 of yokes (18, 19, and 21) is attached to a laterally disposed wiper arm 13, with the connection between the wiper arm 13 and the supporting assembly 12 being at the shaft or axis member 20 on which the main 17 and subordinate 21 yoke structures are mounted. The particular design illustrated in FIG. 2 is especially popular for modern automobiles having a modified cowling permitting withdrawal or recessing of the windshield cleaning apparatus into a space at the base of the windshield. The design places all elements in relatively close proximity or flattened condition against a windshield.

Figure 5:
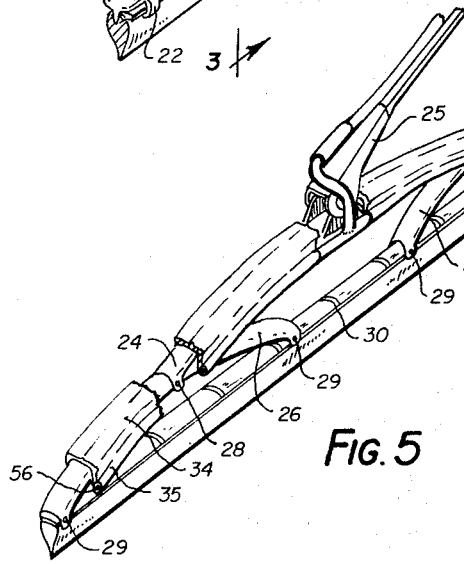
FIG. 5 is a schematic perspective view of composite windshield cleaning apparatus of the invention, particularly illustrating an alternate yoke structure to that shown in FIG. 2.

Another popular yoke structure is illustrated in FIG. 5; and in that structure, a primary yoke member 24 is attached to a wiper arm 25, with the connection of the wiper arm 25 to the yoke structure 24 being essentially immediately above a central portion of the primary yoke structure 24. Secondary yoke structures 26 and 27 are hinged at an intermediate point along their length to the ends of the primary yoke structure 24; and this is illustrated by pin shaft 28 in FIG. 5. The secondary yoke structures 26 and 27 in turn have their ends slidably attached by clips 29 to the flexor strip 30 supporting the rubbery wiper blade 10.

To be recognized is that the frame of the wiper blade 10 will frequently include, but not necessarily critically include, flexor portions or strips (see 23 of FIGS. 2 and 3; and 30 of FIG. 5) which assist (in combination with the yoke structure) in holding the flexible rubber-like blade 10 in intimate contact upon the surface of the windshield during oscillation of the wiper blade even though the windshield may itself be curved, as is most common.

A characteristic of plural yoke structures is that they are arched or archable to some degree in a plane substantially perpendicular to the windshield, and are flexible in that plane. The surface of yoke structures most remote from the windshield is identified herein as the dorsal side; and the opposite surface or inside surface next to the windshield is referred to as the ventral surface.

The fact that the wiper blade, its flexor strip, and the blade supporting assembly (which includes the plural yoke structure), are all flexible in a plane perpendicular to the surface of the windshield is of real significance. What it means is that the actual linear distance between two spaced points on the yoke structure may vary during flexing; but the distance along the dorsal surface of the composite yoke structure will remain the same or substantially the same during flexing. This is true even in the case of the yoke structure illustrated in FIG. 5, where the primary yoke 24 is hinged at its ends to the secondary yoke structures 26 and 27 at a location intermediate the ends of the secondary yoke structures. This characteristic is used to advantage in practicing the teachings hereof, requiring a washer structure as a critical element of the composite windshield cleaning apparatus of this invention. A washer structure, broadly identified by numeral 31 in the drawing, is attached in substantially parallel relationship to the wiper blade supporting assembly 12 for oscillation with that assembly. A feed conduit means 32 connects the washer structure 31 to a source of washing liquid so that washing liquid can be feed to the washer structure.

The feed conduit means 32 suitably may be connected (if desired through any suitable adaptor fitting) to the conventional outlet spray jet 33 located at the base or cowl portion of windshields. A simple "press-on" friction connection is quite satisfactory for attaching the conduit means 32 to a standard outlet spray jet fitting 33. Intermittently squirting washing fluid from outlet 33 is entirely satisfactory as a washing liquid source. Alternately, other sources for powering or forcing washing liquid through the feed conduit means 32 to a washer 31 on the blade supporting assembly may be employed.

Figure 3:
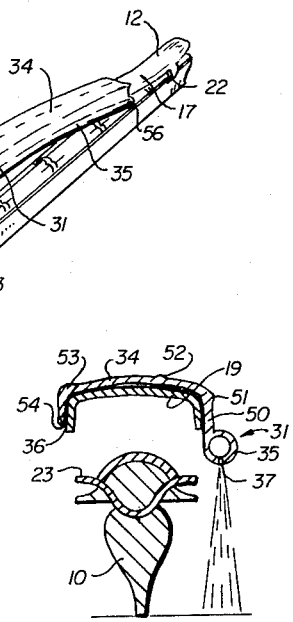
FIG. 3 is a schematic cross-sectional view taken on line 3—3 of FIG. 2 (with background detail broken away and omitted for clarity of view)

Referring particularly to FIGS. 2 and 3, the new windshield spraying washer structure of this invention critically comprises a flexible strip or web portion 34, plus an elongated tubular portion 35, also preferably flexible, fixed along one edge of the strip portion 34. The strip portion itself is suitably characterized as a flange-like member extending laterally from the tubular portion. This flange-like strip portion 34 is fastened by means of adhesive material 36 (see FIG. 3) in a lengthwise manner upon a basic part of the wiper blade supporting assembly. Usually, the flange-like strip portion 34 is suitably fixed or fastened snugly upon the dorsal side of the yoke structure; although, if desired, adhesive affixing of the flange-like strip portion onto the ventral recess or underside of a yoke structure (such as yoke parts 18 and 19 illustrated in FIG. 2) may suitably be employed. The manner in which the flange-like strip portion 34 is adhesively affixed on the supporting assembly is such as to cause the tubular portion 35 of the washer structure to be in a substantially parallel and laterally juxtaposed relationship not only to any yoke structure but to the wiper blade 10 of the cleaning apparatus. The tubular portion 35 is, of course, relatively elevated or further from the windshield than the wiper blade per se.

A plurality of spaced apertures 37 are in the tubular portion. These apertures 37 (not visible for showing in FIG. 2) are located relatively on the ventral side of the tubular portion, that is, on the side of the tubular portion opposing the windshield as the washer apparatus is adhesively affixed to a supporting assembly for a wiper blade. The apertures extend through the wall of the tubular portion; and their location is such that they direct washing fluid toward the windshield at a position adjacent the wiper blade during the oscillation of the cleaning apparatus. Spacing of the apertures along the length of the tubular portion may vary greatly, with apertures as close as about one centimeter being suitable and as far apart as 5 centimeters or more giving useful results. Preferred spacing of apertures along the length of the tubular member is between about 2 and 3 centimeters.

Referring particularly to FIG. 2, it should be noted that the washer structure itself may in fact be applied to the blade supporting assembly as two separate parts, with one section or part 38 on one part 19 of the main yoke 17 and the other section 39 on the other part 18 of the main yoke 17. Thus, the tubular portion 35 of the washer structure 38 on one side of the shaft 20 may be quite separate from the tubular portion 35 of the washer structure 39 on the other side thereof. When this approach is employed, a T-connector composed of leg 40 and arms 41 and 42 is interposed to form a connection between the separated tubular portions of parts 38 and 39 of the washer. The leg 40 of the T-connection is suitably curved snugly over the yoke part 18 at a location contiguous to the shaft 20 at which the yoke is fastened to the oscillatable wiper arm 13. Preferably, the leg 40 of the T is curved snugly over the yoke 18 on the side of the shaft 20 most remote or outwardly from the wiper arm 13. The T-connector itself is, of course, hollow on the inside so as to permit flow of washing liquid through its leg 40 and out each arm 41 and 42 of the cross bar extending perpendicularly from the leg 40. Further, the T-connector is preferably formed out of a material which resists closure of the internal passage through the leg portion of it as the leg portion is bent or curved. While rubbery materials may be employed in forming a suitable T-connector, relatively non-rubbery plastics are generally preferred. Indeed, even metal, such as brass, may be used as the material for the T-connector. If a relatively rigid material is employed for the T-connector, a flexible tube 43 should be placed as part of the feed conduit 32 adjacent the mounting shaft 20 between the yoke structure and wiper arm 13, so as to permit easy flexing of that portion of the feed conduit means 32 as flexing of the yokes takes place during the cleaning operation.

The portion of the feed conduit 32 extending along most of the stretch of the wiper arm 13 may be relatively rigid (and formed of metal such as brass) or completely flexible (and formed of plastics type materials, including even rubbery materials), as desired. It may be fastened in substantially parallel alignment with the wiper arm by adhesive material 44, or by using any other suitable means. Where the feed conduit adjacent the wiper arm is metal, solder attachment to the wiper arm is suitable.

Figure 4:
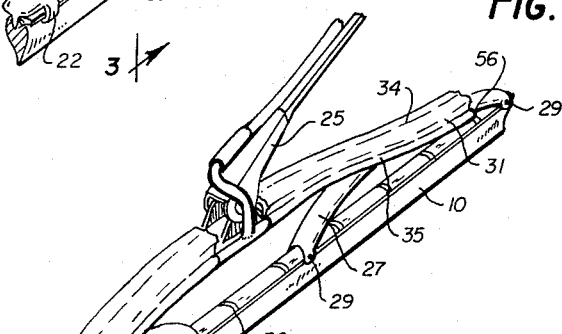
FIG. 4 is an enlarged perspective view of one suitable tie member for fixing a feed conduit for the washer to the wiper arm of a windshield wiper assembly.

Further, as illustrated in FIG. 4, a short flat band 45 of thin flexible material, such as plastic or rubber, with a slit or hole or slot 46 near one end of the flexible material, may optionally be employed as a tie member to hold a feed conduit means 47 in substantially parallel relationship to an oscillatable wiper arm 48. The band is wrapped around the arm and conduit and then the end 49 of the band opposite the slotted end is drawn through the slot 46 and pulled to tighten the band into a loop about the arm and conduit. Preferably, the surface of the band exhibits frictional characteristics or is formed to be sufficiently irregular so as to exhibit sufficient friction characteristics to cause the end as drawn through the slot to resist dislodgement therefrom.

If desired, feed conduit 32 may be formed with at least one substantially flat side, so that a cross-section transversely through it is substantially flat on one side. The flattened side may be covered with a layer of adhesive for attachment of the feed conduit in substantially parallel alignment upon the wiper arm 13.

Another option is to hold feed conduit 32 along wiper arm 13 by means of a spiral wrapping of wire or the like.

The portion of the feed conduit 32 extending from the base of the wiper arm to the source of washing liquid, such as outlet jet 33 (see FIG. 1), should be flexible to allow for movement of it as necessary during oscillation of the wiper arm 13.

If desired, the entire feed conduit 32 as well as the T-connector (composed of leg 40 and arms 41 and 42) and the tubular portion 35 of the washer structure may be formed out of the same material and unified together as an essentially homogeneous structure. Plastics materials including rubbery or rubber-like materials may be employed in fabricating the entire assembly for the washer.

To be stressed is the fact that the washer structure of the invention, with its flange-like strip portion 34 and elongated tubular portion 35 fixed along one edge of that strip portion, is sufficiently flexible for use on an almost infinite variety of wiper blade supporting assemblies. The flange-like strip portion is critically flexible. It may be adhesively affixed along a smooth stretch of dorsal surface of a yoke structure, as illustrated, for example, in FIG. 2, as well as on the dorsal surface of a composite yoke structure having the ends of a primary yoke hinged to a secondary yoke, as illustrated in FIG. 5. Not only is the flange-like strip structure flexible, but it also is preferably stretchable and compressible and even resilient in character. The nature of the hinge connection between a primary yoke and a central portion of a secondary yoke (see FIG. 5) is such that a very slight degree of stretchability or compressibility for the flange-like strip portion 34 is quite sufficient to allow flexing or flexor action of the composite yoke structure in a plane perpendicular to the windshield without substantial hindrance of that action, without disruption of the adhesive attachment or anchorage of the strip portion on the dorsal surface of the yoke structure.

Figure 6:
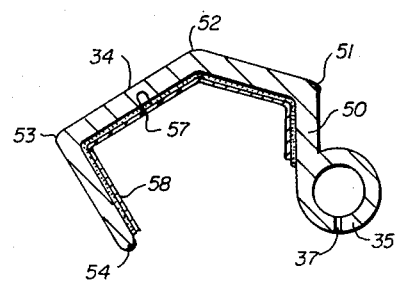
FIG. 6 is a schematic cross section of a windshield washer structure of the invention, as a separate article apart from a wiper assembly.

Referring now particularly to FIG. 6 of the drawing, the nature of the washer structure as suitable for marketing as a separate article of commerce will be described. It critically includes the flexible strip portion 34 and an elongated tubular portion 35 fixed along one edge of the strip portion. The strip portion is more or less flange-like in character, in that it serves as a mounting member and is therefore flange-like. That flange-like strip member 34 extends laterally from the tubular portion 35. The strip member 34 may extend, but need not necessarily extend, as a flat strip from the tubular portion. Preferably, the flange-like strip portion is, in fact, curved into more or less a U-shape. The first stretch 50 extending from the tubular part 35 may extend in a direction somewhat tangential to a portion of the tubular part and in a direction parallel to and opposite from the direction of spray from apertures 37. Then the strip (as we look at the transverse cross-section of FIG. 6 and consider the strip 34 as it extends from the tubular member 35) preferably is bent or curved along two or three lines 51, 52 and 53 substantially parallel to the tubular portion 35. The effect of this is to place the lateral edge 54 of the strip portion 34 (the edge opposite the edge at which the tubular portion 35 is affixed) in a return direction such that it faces or points more or less in a direction biased toward the tubular member 35 (even, optionally, directly toward the tubular member 35). In effect, the strip portion 34 exhibits a transverse cross section of essentially a U-shape, with parts of the U-shape between bends 51, 52 and 53 being suitably substantially flat in character. The opening for the internal recess of the U-shape faces toward or is directed toward approximately the same direction as that for the apertures in the tubular portion. Since the strip portion 34 is preferably quite flexible, and preferably is formed out of rubbery materials or rubber-like materials (such as, for example, neoprene rubber), and because the strip portion is preferably relatively thin, it is easily spread from a U-shape cross-section toward a substantially flattened cross-section for direct adhesive attachment over the dorsal side of a yoke structure (see FIG. 3). Further, however, the U-shaped contour for the strip portion contributes to a natural tendency on its part to achieve a snug enveloping or insheathing of the dorsal side of a yoke structure upon pressing it into intimate adhesive contact on the dorsal side.

In a very real sense, the preferred flange-like flexible strip portion 34 of the washer structures according to this invention are of such a nature as to behave comparably to a tape or tape-like member. Adhesive affixation of the same upon the dorsal side of a yoke likewise is accomplished in a manner comparable in many respects to that of affixing an adhesive tape to a surface.

While the flange-like strip 34 may extend laterally from tubular part 35 in a variety of ways, the preferred washer structures have a flange-like strip member 34 which extends (at least in the initial portion thereof adjacent the tubular portion 35) in a dorsal direction from the tubular portion 35. The dorsal direction is opposite that of the ventral direction toward which apertures 37 face. Additionally, the flange-like strip should include at least one longitudinal bend or change of direction 51 (parallel with tubular part 35), so that at least a portion of the strip member 34 extends away from tube 35 in a direction approximately perpendicular to (or at least intersecting) the dorsal-ventral plane. Thus, the initial portion 50 of the strip serves as a depending member over the edge of a yoke structure, and contributes to accurate orientation of the tubular part 35 is depending relationship along the edge of a yoke structure during adhesive attachment of the washer. The tubular part 35 ends up more or less cantilevered downward from the yoke, but in substantially parallel relationship with both the yoke and the wiper blade of the composite cleaning apparatus. Further, it is in elevated but proximate relationship to the surface of a windshield.

The thickness of the flange-like strip portion 34 may vary. However, the thinner type strip portions are preferred, both from the standpoint of avoiding the use of excess material beyond that needed for functional results as well as from the standpoint of keeping the bulk of the washer, as an added structure on a wiper blade supporting assembly, as small as possible so as to be essentially unnoticeable (or at least non-distracting to a driver). Thus, thin flange-like strip portions on the order of one or two millimeters in thickness are especially desirable. (Although the thickness of the strip portion may, of course, even approach a half-centimeter or more, where desired or necessary, as in the case of huge equipment.) For similar reasons, the tubular portion 35, while it may vary in size in terms of providing the capability for the spray washing function, is preferably maintained as small as possible. It may approach a centimeter or even more in outer diameter; but it is best maintained no larger than about 6 or 7 millimeters in outer diameter, with those no greater than a half centimeter in outer diameter being preferred. Tubular members of about 4 millimeters outer diameter and about 2 millimeters inner diameter have given excellent results. Tube wall thicknesses above about 1 or 2 millimeters are usually unnecessary; but again, it is possible to employ wall thicknesses several times the preferred lower thickness.

Figure 7:
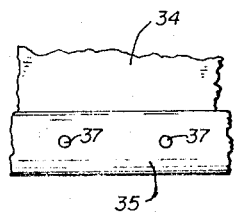
FIGS. 7 and 8 are schematic fragmentary views of the ventral side of the tubular portion of windshield washer structures of the invention, illustrating hole and slit apertures, respectively.

The apertures 37 (see FIGS. 6 and 7) suitably may be openings of round or oval or other shape not significantly expanded in size or changed in shape as washing liquid emerges therethrough on its way to a windshield surface. They generally will have a width measurement not in excess of a half centimeter, and preferably not in excess of about 2 or 3 millimeters. Holes of a diameter on the order of 1 millimeter are quite satisfactory.

Figure 8:
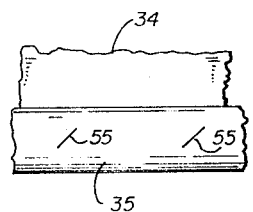

But, as illustrated in FIG. 8, slit-like apertures 55 in a tubular member 35 are also useful. They expand or are opened as washing liquid passes through them; and thus they change in shape as washing liquid is sprayed on a windshield. After the pressure of the washing liquid, as fed from any suitable source and by any suitable means, drops below that needed to open slits 55, those slits will return to a substantially closed condition. This, in turn, tends to obstruct air intake through slits 55, and to obstruct consequent drainage of washing liquid from the tubular portion. The result is that washing liquid is held within a tubular portion 35 having slit apertures 55, so that the washing of a windshield is quickly effected after initiating operation of the pressure source for the liquid. Slit-like apertures may extend directly through the wall of the tubular member (and thereby exhibit the shortest possible distance from the interior to the exterior of the tubular member), or extend at an angular relationship through the wall, to not only increase the distance of travel for washing liquid through the apertures but also alter the direction of the spray emitting therefrom.

It will be appreciated that the ends 56 of the tubular member or members are suitably plugged or sealed against escape of washing liquid in useless directions.

Referring again to FIG. 6, the washer structure, as a separate article of commerce, may include a layer 57 of adhesive material on the surface of the strip portion 34 designed for adhesive affixation upon a yoke structure (that is, on the interior surface of the U-contour for the strip portion), plus a removable and disposable release liner 58 temporarily positioned over the adhesive layer 57 to protect it from contamination during shipment and storage. A suitable liner 58 having a release surface in contact with the adhesive 57 may be formed using conventional technology. Illustratively, polyethylene coated Kraft paper is widely used as a release liner. Also liners coated with release surfaces of silicone or siloxane materials are useful.

Amongst the useful adhesives to employ for layer 57 are those of the normally tacky and pressure sensitive type. Frequently these are also characterized as rubber-resin type adhesives; and typical pressure sensitive adhesives of the rubber-resin type may be found in U.S. Pat. Nos. 2,177,627; and Re. No. 24,906, here incorporated by reference. While such adhesives may be formed by blending rubbery materials with tackifier resins to achieve the necessary balance of adhesion, cohesion, stretchiness and elasticity for the pressure sensitive adhesive properties, they also may be formed by using certain synthetic polymers which inherently possess the four-fold balance of properties for pressure sensitive adhesives. Thus, such polymers are considered the equivalent of rubber-resin adhesives and regard as rubber-resion type adhesives. An illustrative such polymer is 75:25 copolymer of 2-ethyl-butyl-acrylate and ethyl-acrylate. Amongst the synthetic polymers which are inherently pressure-sensitive are those having an acrylic-type radical; and especially preferred are those acrylic-type adhesives of the aforenoted U.S. Pat. No., Re. 24.906.

It is emphasized, however, that adhesives other than pressure sensitive ones are useful to adhere the flange-like strip portion 34 to a yoke structure. Thus, conventional adhesive cements may be employed. Rubbery adhesive cements, including those applied by hand as a person installs the washer structure, are useful. Contact bond adhesive cements may be used. Neoprene type adhesive cements give desired results. Delayed tack adhesives (i.e., those which are normally non-tacky but are tackified at elevated temperatures and remain tacky at least for a time thereafter) represent a still further option for affixing the washer as aforedescribed. The selection of adhesive may vary depending upon the particular wiper blade supporting assembly and the particular design or structural features one builds into the flange-like strip portion of the washer structure. Rarely will it be desirable or necessary to remove the washer once it is installed; thus, permanent bond adhesives are completely acceptable and even desirable to employ. Even when pressure-sensitive adhesives are used, the preferred practice is to use those of the more aggressive and strong bond characteristics (such as the acrylic type aforediscussed).

Fabrication of the washer structure may be accomplished in a variety of ways. Extrusion in the cross-sectional form illustrated in FIG. 6 is useful. The holes or apertures may be formed in the extruded material by drilling, cutting, burning and the like. Alternately the elongated plural port washer structure might be formed by injecting molding or by other molding processes, with or without aperture formation simultaneously with molding. Parts or portions of the washer structure and of the feed conduit for it may be formed separately and then bonded or otherwise united together. An advantageous feature militating in favor of extrusion formation is that different lengths of washer structure are easily cut from the extruded strip to make washers of different sizes as may be desired for different vehicular yoke structures.

The material selected for the washer structure, particularly the flange-like strip portion, must exhibit flexibility. Therefore, organic plastics materials, which is a characterization inclusive of rubbery materials, are most preferred. Illustrative useful plastics are nylon, polyvinyl chloride, and polyethylene, as well as those of rubbery character, particularly neoprene rubber. Rubbery type plastics, especially neoprene, have given excellent performance results when the entire washer structure is formed therefrom. Rubber material of a Durometer between about 45 and 60 is most preferred in terms of gaining desired sturctural features and more or less optimum flexibility for unitary or homogeneous washer structures consisting of the flange-like strip portion and the tubular portion. Thus washers where both the tubular portion and strip portion are formed out of an essentially homogeneous mass are especially desirable. But the option does exist to employ a tubular member of relatively stiff character in combination with the flexible strip portion. For example, relatively stiff plastic or rubbery tubular member, or even a metallic tubular member, might be adhesively fixed along one edge of a flexible strip portion in the arrangement illustrated in FIG. 6. Alternately, a relatively stiff tubular member might be held along one edge of the flexible strip portion by loops in the nature of belt loops extending from that edge of the strip portion. Indeed, the possibility exists to form both the strip portion and tubular portion out of metal, with the strip portion being so thin and the selected metal so malleable that sufficient flexibility is exhibited by the strip portion for adhesive installation of the same on yoke parts such as illustrated in FIG. 2. Where the material selected for the strip portion is known to exhibit poor bonding to the adhesive one intends to employ, the surface of the strip portion at which adhesive bonding is to be achieved may be scored or pre-treated or primed using technology borrowed from the adhesive art so as to achieve required bonding action.

Many further variations or modifications may be made or added to the teachings herein while still retaining the essential benefits of the invention. The color of the washer structure may be keyed or contrasted as desired to vehicle colors. A tubular portion may be fixed along both edges of a strip portion where it is desired to achieve a washing liquid spray before and behind a wiper blade as it oscillates in each direction (as contrasted to the achievement of such spray in advance of the blade as it oscillates in one direction and behind it on its return in the opposite direction). The transverse cross-sectional character of the tubular portion as well as the strip portion may be embellished with ridges or valleys to impart respective strengths and weakness along those lines. Parts of the strip portion may be cut away or removed in limited areas, if desired. Connection between a feed conduit and the tubular portion may vary. Where a T-connector is used, an aperture or apertures may be placed in the cross-bar of the T. The tubular portion may have portions of its wall thicker than others, or may have a web or fin extending from it in a parallel or other direction from the direction of projection exhibited by the strip portion. But the washer structure hereof is simple, easily adhesively affixed, and reliable in operation to provide washing liquid adjacent a wiper at almost any speed of travel. Further, it admirably performs the function of a glare shield in that it covers a substantial part of the chrome or shiny metallic blade supporting assembly.

That which is claimed is:

1. A windshield washer structure for adhesive attachment in a substantially parallel contiguous relationship to a wiper blade supporting assembly for oscillation with said assembly during cleaning of a windshield, said structure comprising an elongated flexible strip portion and an elongated tubular portion fixed along one longitudinal edge of said strip portion, said strip portion being characterized as a flange-like member extending laterally from said tubular portion, said flange-like strip portion being adapted to nest snugly in adhesive attachment lengthwise upon a wiper blade supporting assembly to cause said tubular portion to be in a substantially parallel and laterally juxtaposed relationship to the wiper blade supported by said assembly, and said tubular portion having a plurality of apertures therein located relatively on the ventral side thereof opposing a windshield as said washer structure is affixed as aforesaid upon a wiper blade supporting assembly, whereby in operation said apertures are adapted to direct washing fluid as fed to said tubular portion toward the windshield at a position adjacent the wiper blade during oscillation of the supporting assembly.

2. The washer structure of claim 1 wherein said flexible strip portion is substantially U-shaped in cross-section throughout its length, with the opening for the internal recess of the U-shape facing in approximately the same direction as said apertures of said tubular portion.

3. The washer structure of claim 1 wherein the side of said strip portion adapted to be adhesively affixed upon a wiper blade supporting assembly carries a layer of adhesive affixed thereto.

4. The washer structure of claim 3 wherein said adhesive comprises a pressure sensitive adhesive.

5. The washer structure of claim 3 additionally comprising a removable liner over said layer of adhesive.

6. The washer structure of claim 1 additionally characterized by the fact that said flexible strip portion and said elongated tubular portion are unified as a substantially homogeneous part.

7. The washer structure of claim 6 wherein said flexible strip portion is substantially U-shaped in cross-section throughout its length, with the opening for internal recess of the U-shape facing in approximately the same direction as said apertures of said tubular portion.

8. The washer structure of claim 6 wherein the side of said strip portion adapted to be adhesively affixed upon a wiper blade supporting assembly carries a layer of adhesive affixed thereto.

9. The washer structure of claim 1 additionally comprising feed conduit means connected to said tubular portion in a manner adapted to permit said feed conduit to carry washing liquid to the interior of said tubular portion.

10. The washer structure of claim 1 wherein said apertures consist essentially of openings not significantly expanded in size as washing liquid passes therethrough.

11. The washer structure of claim 1 wherein said apertures consist essentially of slits through the wall of said tubular portion, said slits being adapted to open as washing liquid is passed therethrough.

12. In a windshield cleaning apparatus comprising an elongated wiper blade for wiping the windshield, a wiper blade supporting assembly including a yoke structure connected to an oscillatable wiper arm, said yoke structure being archable in a plane substantially perpendicular to the windshield, both said wiper blade and said blade supporting assembly being flexible in said plane, a windshield spraying washer structure attached in substantially parallel relationship to said blade supporting assembly for oscillation with said assembly, and feed conduit means connecting said washer structure to a source of washing liquid for feeding washing liquid to said washer structure, the improvement wherein said windshield spraying washer structure comprises an elongated flexible strip portion and an elongated tubular portion fixed along one longitudinal edge of said strip portion, said strip portion being characterized as a flange-like member extending laterally from said tubular portion, said flange-like strip portion being adhesively affixed to nest snugly lengthwise upon said yoke structure of said wiper blade supporting assembly to cause said tubular portion to be in a substantially parallel and laterally juxtaposed relationship to said wiper blade, and said tubular portion having a plurality of apertures therein located relatively on the ventral side thereof opposing the windshield for directing washing fluid as fed to said tubular portion toward said windshield at a position adjacent said wiper blade during oscillation thereof.

13. In the apparatus of claim 12, wherein said connection of said yoke structure to said oscillatable wiper arm is at a location intermediate the ends of said yoke structure, wherein the tubular portion of the washer structure on one side of said connection is separated from the tubular portion of the washer structure on the other side of said connection, and wherein a T-connector is interposed as a connection between said separated tubular portions, with the leg of said T-connector curved snugly over the yoke structure at a location contiguous to said connection between said yoke structure and said oscillatable wiper arm, and with the end of said leg of said T-connector attached to said feed conduit means for feeding washing liquid to said washer structure.

14. In the apparatus of claim 12, the additional feature comprising means for fastening said feed conduit means in substantial alignment along said oscillatable wiper arm.

* * * * *